(12) United States Patent
Haines et al.

(10) Patent No.: US 9,303,890 B2
(45) Date of Patent: Apr. 5, 2016

(54) INTELLIGENT HVAC REGISTER AIRFLOW CONTROL SYSTEM

(71) Applicants: Russell Haines, Rotorua (NZ); Cory Grenier, Sunnyvale, CA (US)

(72) Inventors: Russell Haines, Rotorua (NZ); Cory Grenier, Sunnyvale, CA (US)

( * ) Notice: Subject to any disclaimer, the term of this patent is extended or adjusted under 35 U.S.C. 154(b) by 137 days.

(21) Appl. No.: 13/986,044

(22) Filed: Mar. 27, 2013

(65) Prior Publication Data

US 2014/0330438 A1    Nov. 6, 2014

(51) Int. Cl.
*G06F 19/00* (2011.01)
*F24F 11/00* (2006.01)
*G05B 15/02* (2006.01)
*F24F 13/15* (2006.01)
*F24F 13/08* (2006.01)

(52) U.S. Cl.
CPC ........... *F24F 11/0076* (2013.01); *F24F 11/006* (2013.01); *F24F 13/082* (2013.01); *F24F 13/15* (2013.01); *G05B 15/02* (2013.01); *F24F 2011/0063* (2013.01); *F24F 2011/0067* (2013.01); *F24F 2011/0071* (2013.01)

(58) Field of Classification Search
CPC ......... F24F 11/04; F24F 13/082; F24F 13/10; G05D 23/1932
USPC .................................. 700/276; 236/49.3, 51
See application file for complete search history.

(56) References Cited

U.S. PATENT DOCUMENTS

| | | | |
|---|---|---|---|
| 4,086,781 A * | 5/1978 | Brody | F24F 11/04 165/250 |
| 8,249,731 B2 | 8/2012 | Tran | |
| 2005/0064811 A1* | 3/2005 | Mrozek | F24F 13/1426 454/303 |
| 2010/0163633 A1* | 7/2010 | Barrett | B60H 1/00871 236/49.3 |
| 2011/0034120 A1* | 2/2011 | Jaiyeola | F24F 11/006 454/335 |
| 2011/0077758 A1* | 3/2011 | Tran | A61B 5/1113 700/94 |

* cited by examiner

*Primary Examiner* — Michael D Masinick
(74) *Attorney, Agent, or Firm* — Kenneth Bower; Lyman Smith

(57) ABSTRACT

Intelligent HVAC register is an HVAC register outlet which can control the temperature in a space by operating independently. The Intelligent HVAC register works in network with other vents within the system using low power wireless technology and a smart application so that the temperature of multiple individual spaces can be controlled while operating on a single HVAC system. Intelligent HVAC register uses a solar strip to charge the battery which runs each vent's hardware. This enables more efficient use of energy as airflow to unused spaces can be blocked therefore keeping air pressure and efficiency higher in the spaces where temperature adjustments are necessary. Intelligent HVAC register can be controlled using a learning application on a smart device. By setting the time & temperature needed in each space the Intelligent HVAC smart vane will automatically open or close to keep the room at the desired temperature.

16 Claims, 9 Drawing Sheets

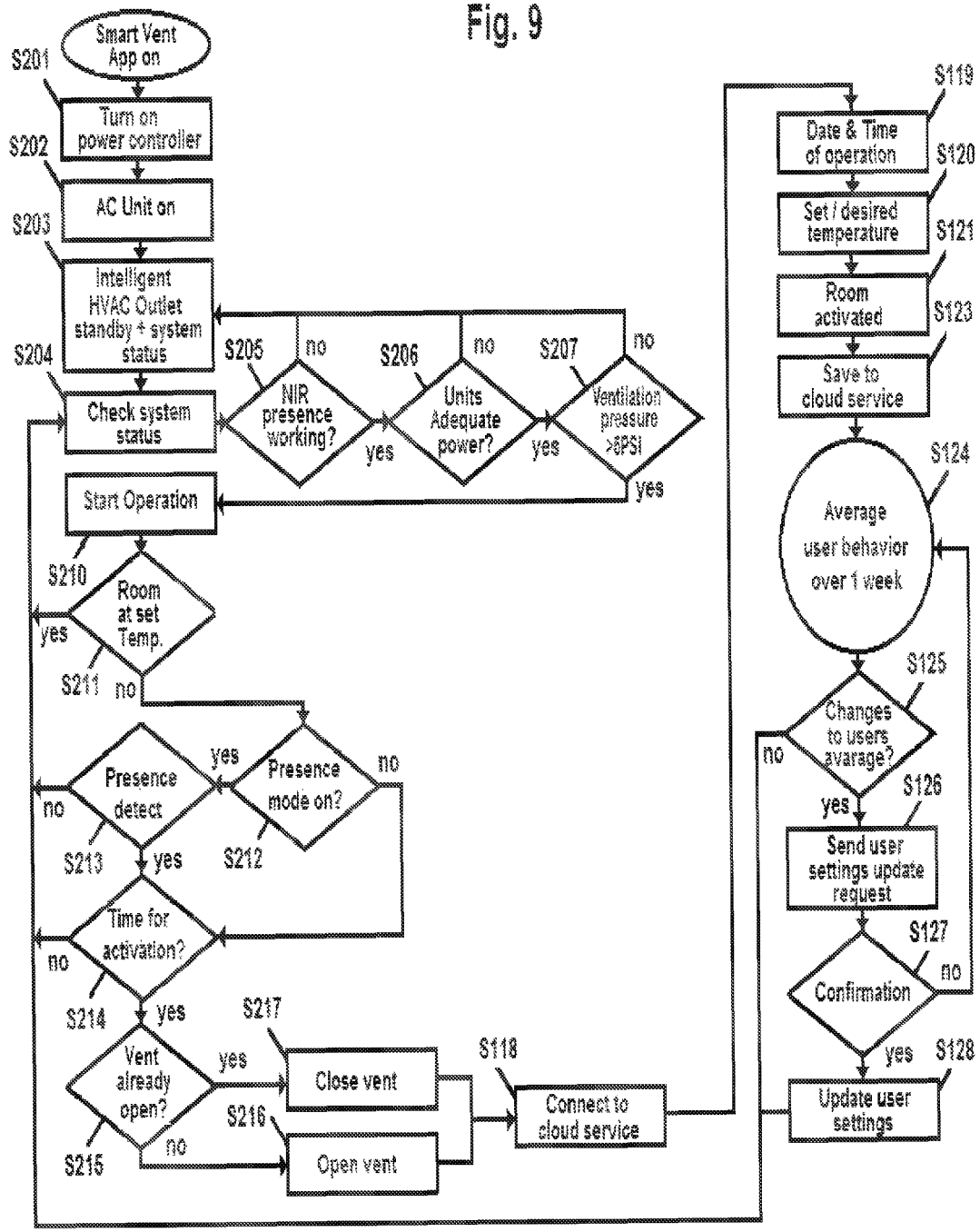

INTELLIGENT HVAC REGISTER AIRFLOW CONTROL SYSTEM

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND

The background of this invention derives from the fact that improved energy efficiency within the home has become a necessity due to soaring costs and environmental issues. Existing products seek to cut energy bills through home automated controls, however many solutions are ineffective due to pre-existing structures or designs already installed within the home, such as central HVAC systems where ducts are unable to be modified due to the high labor cost of retrofitting original residential structures. On average 54% of a home's electrical power consumption is expended on space heating and cooling.

Intelligent HVAC smart register enables home owners to retrofit their current HVAC systems and automate their homes systems in a cost effective and simple way. By replacing existing registers with the Intelligent HVAC smart registers, the home owner can turn a passive HVAC system into a smart system where they can manage their homes heating and cooling characteristics.

The majority of HVAC systems operate off a single thermostat and AC (air conditioner) unit, which means that a home's various rooms are tied to one air circuit regardless of whether a room is occupied or not. Intelligent HVAC smart register is able to manage each space individually, thus optimising the energy used, by directing air flow to where it is needed, whilst blocking it off where heating or cooling is not required.

The Intelligent HVAC smart registers system is able to be controlled by a single smart device, thus software programs are able to be developed and online resources such as weather reports or GPS utilised to enable maximum heating and cooling system effectiveness.

The ease of which the system can be installed and set up is due to its low power design, where a self contained unit does not require hard-wiring for a power supply. The energy efficient design consists of low power wireless technology working with hardware that is optimized by a power conserving mechanical design. This means the Intelligent HVAC smart register is able to operate for years without regular battery replacement or maintenance.

PRIOR ART

The following prior art is representative of what is published in the field of Intelligent HVAC smart register devices:

U.S. Pat. No. 8,249,731 to inventor Tran, discloses a system to control energy consumption in a building which has a plurality of rooms. However, the disclosure of inventor Tran lacks a low power wireless solution. These technologies will enable the Intelligent HVAC smart register to operate for an extended period (multiple years) using a single power cell. The support of an energy harvester such as a solar cell will guarantee the Intelligent HVAC smart register can stay in full operational service for extended periods. Furthermore inventor Tran, lacks a mechanical solution which will utilize the air pressure from within the ventilation system to open the vent, thus eliminating the need for additional power usage which would be required to drive a motor or servo to open and also close the vent, further enhancing the low power solution of Intelligent HVAC smart register.

Patent Number US 201010163633 A1 to inventor Barrett, Lingemann discloses an automatically balancing register for HVAC systems. However, the disclosure of inventor Barrett, Lingemann lacks a software application (App) which can be loaded onto a pre-existing smart device such as a cell phone or tablet. This enables the device with digital intelligence thereby interacting with software and systems such as Global Positioning System (GPS) to identify when a user is returning home prompting operation. In addition weather reports and temperature monitoring will enable the Intelligent HVAC smart register system to operate intelligently and continuously learn from past behavior and preferences.

BRIEF SUMMARY OF THE INVENTION & OBJECTIVES

The first objective of the Intelligent HVAC smart register is to create a product capable of changing existing HVAC systems into smart HVAC systems which can manage heating and cooling of indoor spaces, thus saving users money on energy bills.

To manage the hot and cold air flow within a traditional HVAC system, the Intelligent HVAC smart register is designed to block and open the outlets of the HVAC ducting at times when the temperature within a space is different to the temperature set within the Intelligent HVAC smart registers application. To achieve this objective while minimizing power consumption, the Intelligent HVAC smart registers mechanical design of the vanes use air pressure from within the HVAC duct to push open the registers veins when a release mechanism is triggered by a difference between the thermostats ambient temperature reading and desired ambient temperature set with in the Intelligent HVAC smart register application.

To ensure adoption of Intelligent HVAC smart registers into homes, the Intelligent HVAC smart register needs to be easy to install and operate.

To meet these objectives the Intelligent HVAC smart register must operate on an independent power source, requiring zero wiring. The independent power source should support the operation of the Intelligent HVAC smart register for extended periods of time utilizing the latest low power technologies to ensure long term operation. These include new low power wireless technologies as well as new low power sensor and servo technologies.

To create a 'smart' register, an application is installed onto a smart device to manage the Intelligent HVAC smart register. Users can conveniently set-up Intelligent HVAC smart register in one initial step by entering the "zoning state" and walking throughout each room and hallway of the home with a smart handheld device. The Smart application sets up temperature requirements based on presence and time of day.

Once the zone is defined, users can remotely monitor each room's temperature online, for instance to ensure a sleeping child or pet is being properly warmed or cooled.

The Individual Intelligent HVAC smart registers automatically open or close relative to temperature, human presence, or set schedule. The 'smart' register learns the unique room requirements of each home and concentrates heating and cooling when and where energy is needed, thus reducing home energy costs and environmental impact. Each Intelligent HVAC smart register incorporates a thermal diode to estimate room temperature and communicates on a low energy network utilizing broad spectrum low power based wireless devices. To minimize electricity use, Intelligent HVAC smart register products include a solar strip, low power solenoids, and non-actuated registers that harness the air pressure from the HVAC fan to enable the register to open or close.

Register based proximity sensors using pulse width modulation (PWM) of infra red (IR) are recorded by a smart phone, tablet, laptop or PC to build a data base of the users behavior within the home, including schedules and preferences so the Intelligent HVAC smart register can anticipate when and where to target your heating/cooling needs.

When you are nearing your home, GPS location will trigger your Intelligent HVAC smart register application to prepare your home for your arrival. The Intelligent HVAC smart register application takes into account your user history, such as the rooms you usually occupy upon arrival and time you usually go to bed and heats and cools occupied spaces accordingly. Intelligent HVAC smart register can also track your energy consumption and build usage scenarios for you to meet your energy saving targets.

BRIEF DESCRIPTION OF THE SEVERAL VIEWS OF THE DRAWING(S)

Figure 6:
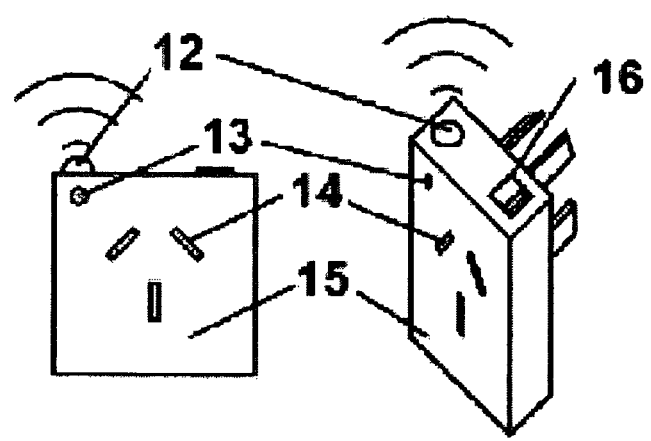

FIG. 6. Is a front and oblique view of the AC power control unit.

Figure 7:
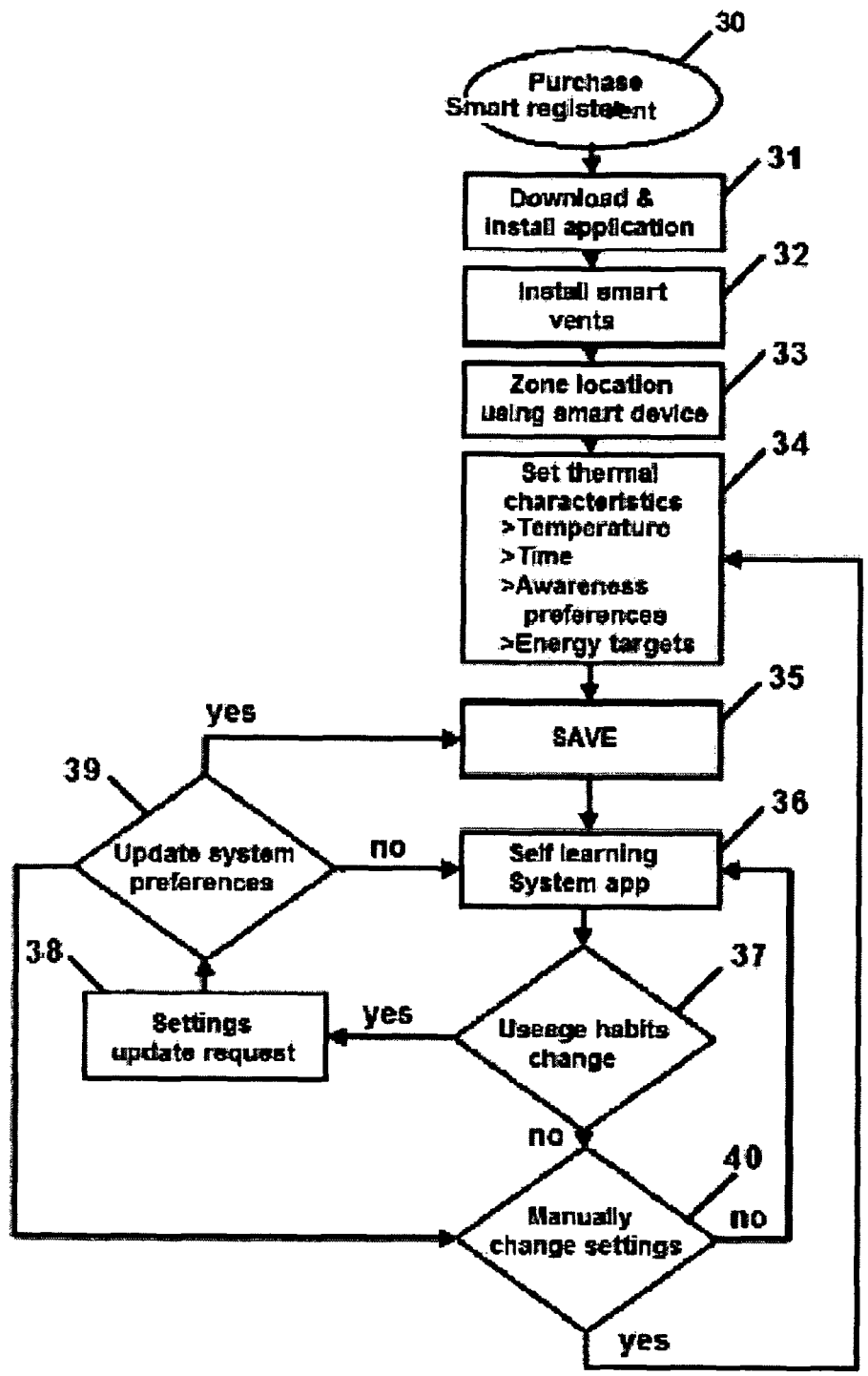

FIG. 7 is a flow chart showing the Intelligent HVAC Smart register hardware function process.

Figure 8:
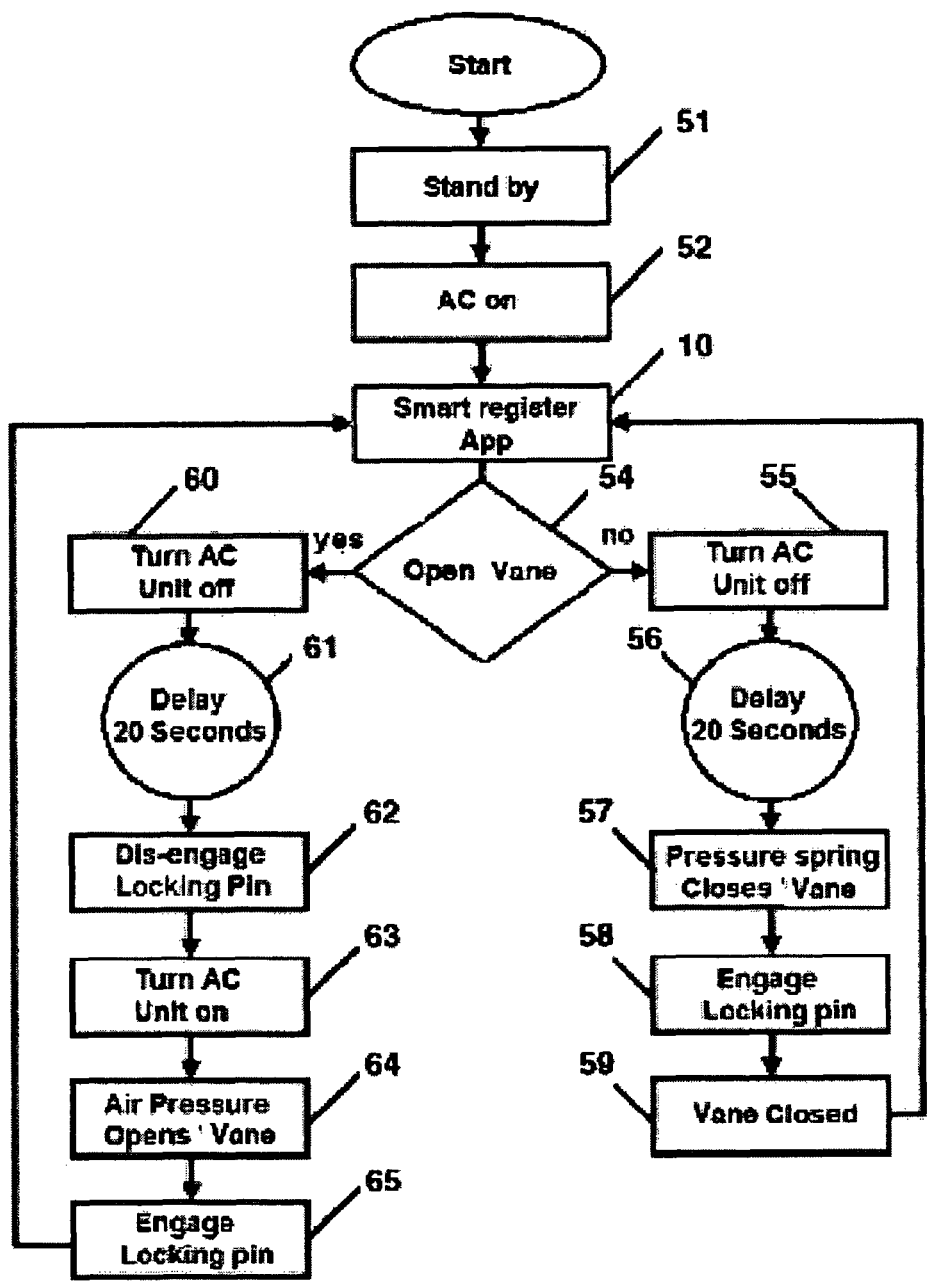

FIG. 8 is a flow chart showing the Intelligent HVAC Smart register hardware logic process FIG. 9 is a flow chart showing the Intelligent HVAC Smart register software logic process

DETAILED DESCRIPTION OF THE INVENTION

The following description should be read with reference to the drawings, whereby like elements in different drawings are numbered in like fashion. The drawings, which are not necessarily to scale, depict selected embodiments and are not intended to limit the scope of the Invention.

Intelligent HVAC Smart Register Introduction

Figure 1:
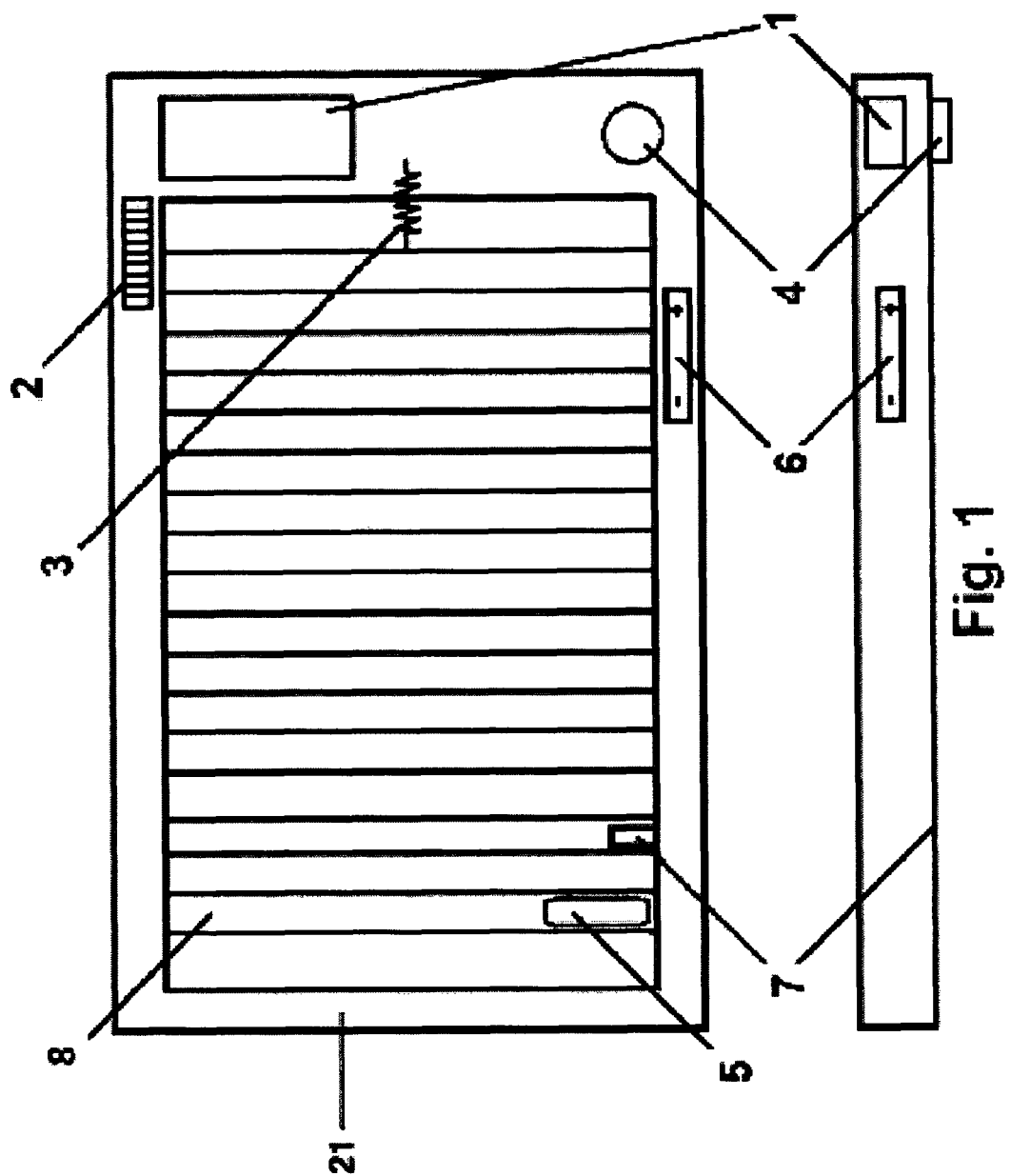
FIG. 1 Is a Top, and side view of the Intelligent HVAC (heating, Ventilation, Air conditioning) Smart register.

FIG. 1 Shows the Intelligent HVAC Smart register 21 in top and side views. This component enables the airflow to be controlled; this is done by using the hinged vane 8 to moderate air flow. This component can be opened or closed by utilizing the on I off cycle of the main AC unit or air pump 17. This can also be performed by the Intelligent HVAC Smart register Power controller 15 which serves as a backup. This device is wirelessly connected to the various Intelligent HVAC Smart registers around the home by a wireless network 11, meaning that various Intelligent HVAC smart register(s), around the home can relay the information and settings required to provide automated & intelligent operation. The Intelligent HVAC smart register 21 can also be controlled remotely by a smart device 9. This is done by installing the Intelligent HVAC smart register application 10 onto the smart device 9. A smart device is one which has an operating system (OS) and has online network capability. This application 10 is used to set-up the system and user preferences as well as monitor and adjust the system on the go. User data and information are stored on the Intelligent HVAC Smart register cloud storage 12 via the wireless network 11.

First Angle Overview of the Intelligent HVAC Smart Register

Figure 2:
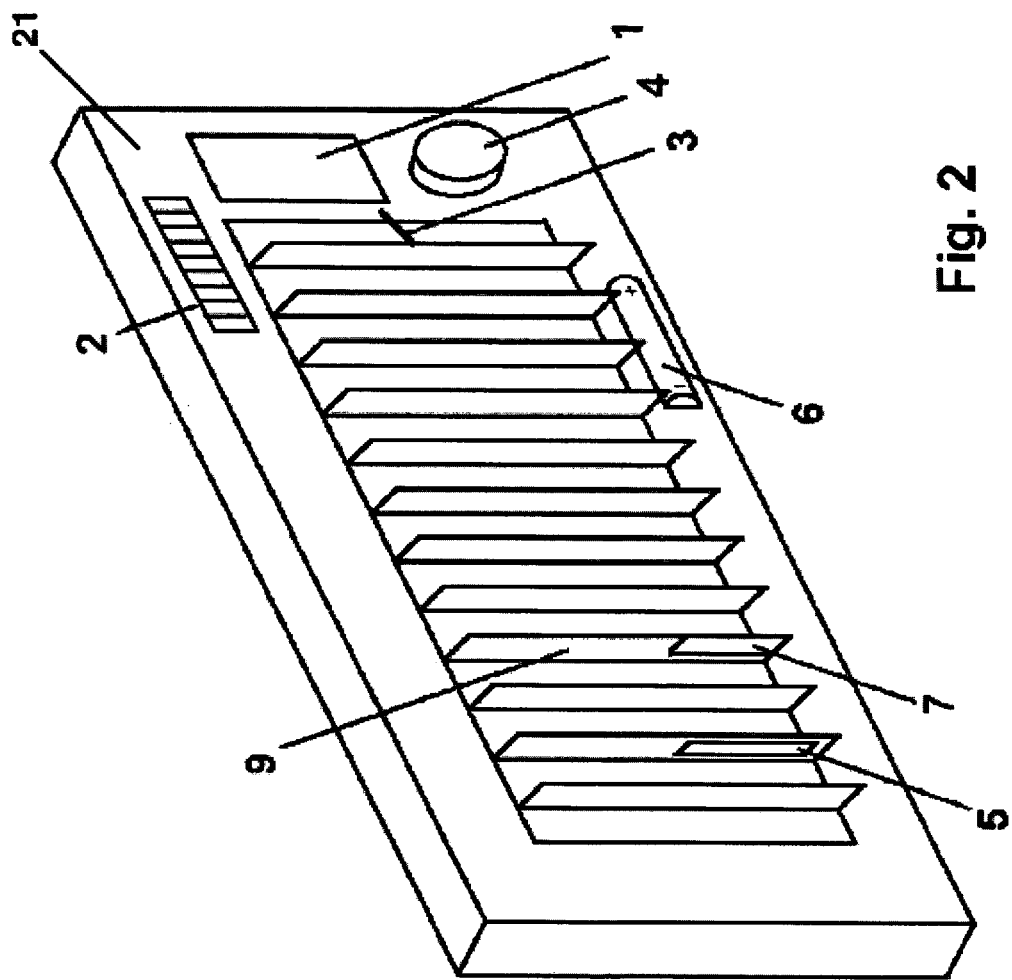
FIG. 2 Is an 1st angle view of the Intelligent HVAC (heating, Ventilation, Air conditioning) Smart register

FIG. 2 Shows the Intelligent HVAC smart register 21, and the hinged vane 8, which is opened by air pressure caused when the main AC unit 17 is delivering air flow. When there is no airflow the hinged vane 8 can be pulled close by the pressure spring 3. And if the hinged vane 8 needs to remain closed while there is air pressure in the system (i.e. while other rooms need to be ventilated) a locking pin or latch 7 is activated to keep the vanes 8 closed. When the register needs to re-open the locking pin or latch 7 is disengaged. This action is put into effect when an open or close signal is sent from the Intelligent HVAC Smart register Power controller 15 via the wireless network 11. This signal is received by the unit's antenna 2, which then relays the information to the electronics module I sensors unit 1. These components are all powered by a battery 6 charge generated by a solar cell power feed 5. The solar cell collects its charge from the ambient room light. The Intelligent HVAC Smart register 21 can also be automatically opened if presence is detected in the room by the Near-Infrared Reflectance (NIR) presence detect module 4.

Smart Device, Cloud Storage and Wireless Network Relationship

Figure 3:
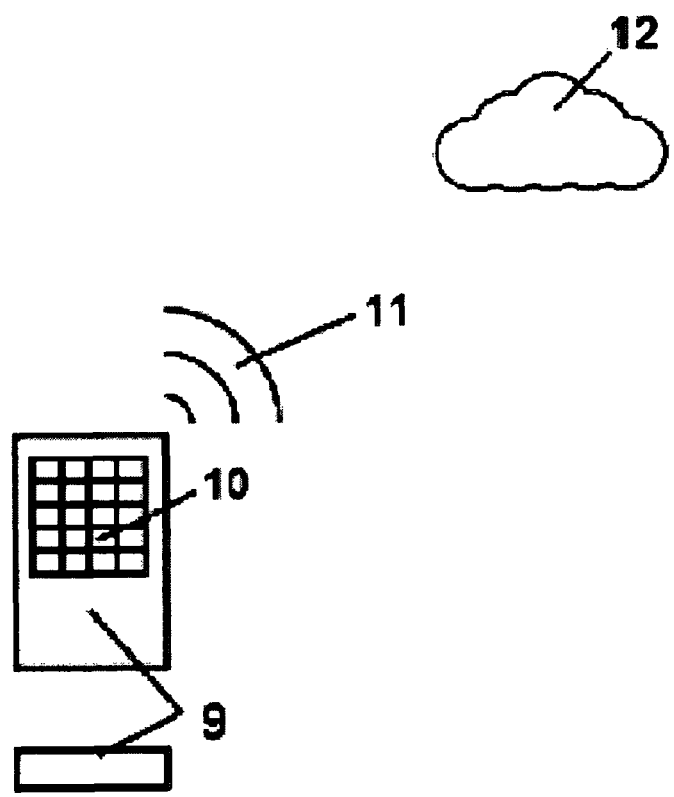
FIG. 3 is a Oblique view of an example of a smart device used to control the Intelligent HVAC Smart register and a representation of the cloud service used to store the data.

FIG. 3 Intelligent HVAC smart register 21 system are controlled via a smart device 9, this device should support an operating system and have wireless capability. An Intelligent HVAC Smart register application 10 is installed on the device and user preferences are input to activate the Intelligent HVAC Smart register. The device is linked via a wireless network 11, which means that the system can be controlled remotely while communicating the Intelligent HVAC smart register cloud service 12

Smart Device, Cloud Storage and Wireless Network Relationship

Figure 4:
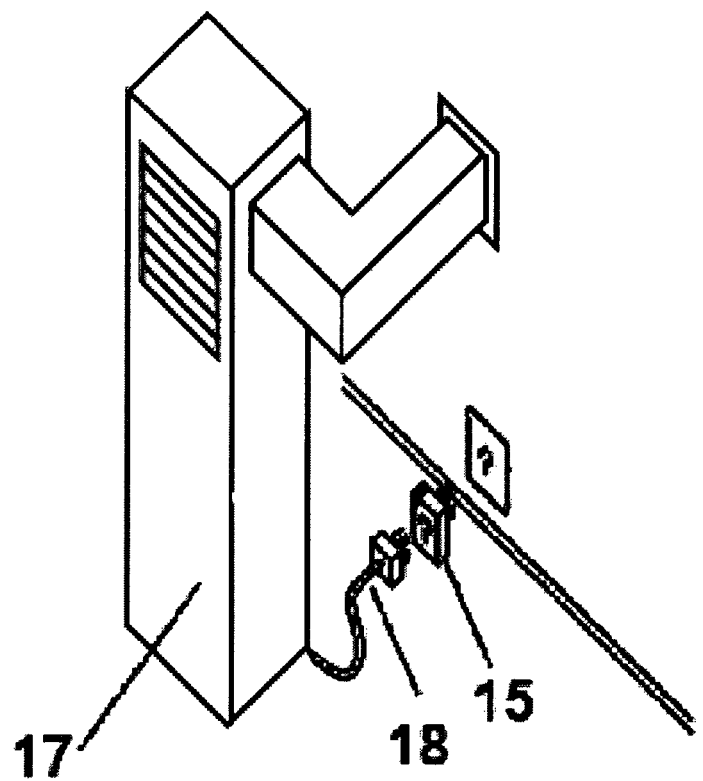
FIG. 4 is an oblique view of the AC heat pump and ducting and power control unit.

FIG. 4 The Intelligent HVAC Smart register Power controller 15 enables the main AC unit 17, to be activated and controlled without having to modify the existing unit. The Intelligent HVAC Smart register Power controller 15 is controlled via the smart device 8 via the wireless network 11. The status LED 13 is a simple indicator that indicates power and operating status of the system. The system master power switch is also on the Intelligent HVAC smart register power controller 15. The Plug hole for AC unit power plug 14 is where the power plug 18 for the main AC 17 unit is plugged into.

Home Floor Plan with Intelligent HVAC Smart Register System Installed

Figure 5:
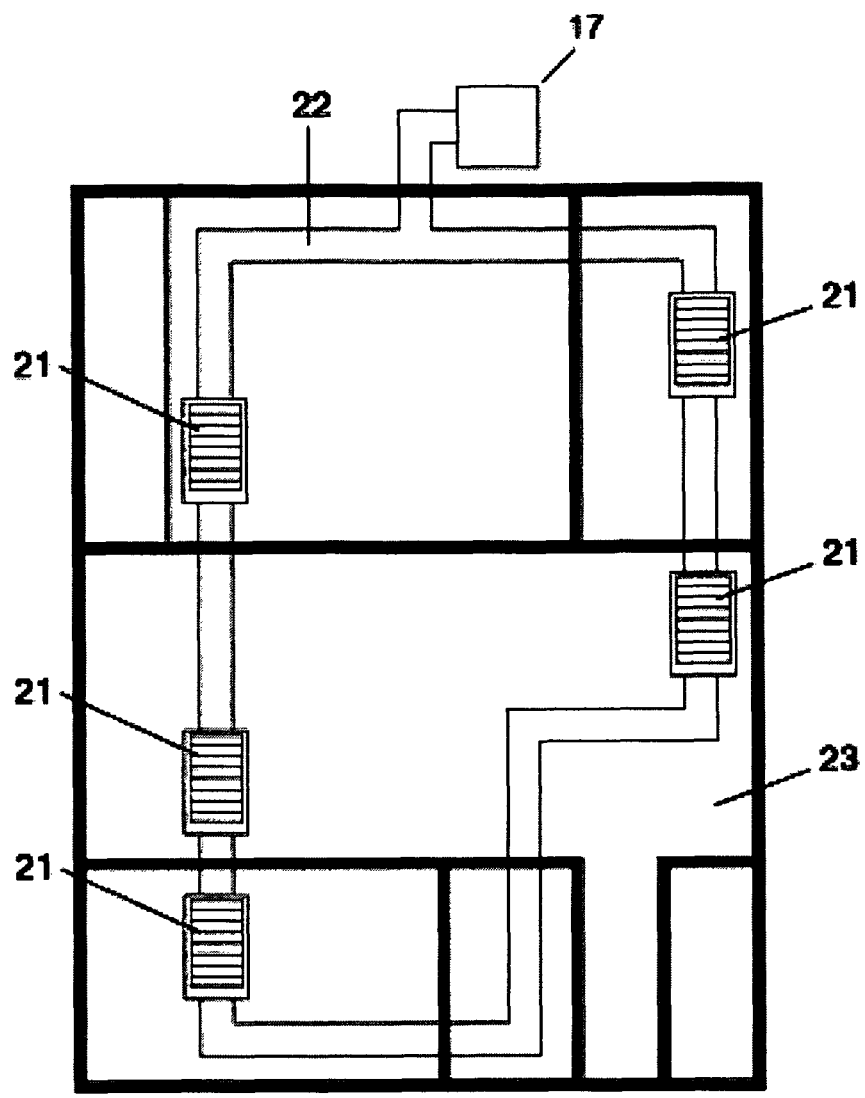
FIG. 5 is a plan drawing of a residential HVAC ducting and scenario with multiple Intelligent HVAC smart registers installed.

FIG. 5 is a floor plan of a home scenario with multiple Intelligent HVAC smart registers 21 functioning within the existing heating system. The air pump 17 placed near the structure of the home or building 23. The main HVAC air ducting into each room can have an Intelligent HVAC Smart register placed on the ducting 22 outlets to turn that space into a smart register controlled space.

Power Controller Overview

FIG. 6 shows the HVAC smart register power controller 15 where the main AC unit 17 plugs into the main power plug inlet 14. Upon establishing power, indicator LED 13 will turn on to show the power status. Using the power generated from the wall, the power controller will be able to communicate with the smart application 10, via the smart register storage cloud 12 using the wireless network 11. The power controller 15 features a master on & off switch 16.

How to Use Intelligent HVAC Smart Register Diagram

FIG. 7 shows that Intelligent HVAC smart register can be purchased online or in a store 30. Once purchased a download code is provided to access the Intelligent HVAC smart register website to download and install 31 the Intelligent HVAC Smart register application 10. Once the application is installed the user will be able to access a step by step guide on how to safely and effectively install 32 the Intelligent HVAC Smart register system in their home or office. Once the intelligent HVAC smart register 21, and Intelligent HVAC Smart register power controller 15 have been installed correctly according to the Intelligent HVAC smart register user guide, the user can then begin to zone 33 and set the thermal characteristics of their locations 34 within their environment, walking around the area to be zoned holding the smart device and following the prompts of the Intelligent HVAC Smart register self-learning system application 36. Once the process completes the settings are saved 35. Once use begins the Intelligent HVAC Smart register application 10 will begin to document user behaviors such as daily schedules, preferences and energy targets so that the Intelligent HVAC Smart register application 10 can begin to anticipate and efficiently run the system. If average user habits change 37 over a set period the system will provide an 38 update request to the system preferences 39 via the 8 Smart devices. Confirmed changes will be saved in the system 35. If the user ignores the request the usage settings will remain, if settings changes are immediately required the user may change manually 40 via the Intelligent HVAC Smart register application 10.

Intelligent HVAC Smart Register Hardware Function Logic Diagram

FIG. 8 Is a logic diagram which shows that when the system is activated it will be placed on standby 51 by the Intelligent HVAC Smart register Power controller 15, the system will then provide power and turn the AC on 52 the AC unit by enabling power via the Intelligent HVAC Smart register Power controller 15. The Intelligent HVAC Smart register application 10 will then access each individual zones status and requirements, thus deciding whether to Open 54 the vane. For both instances air pressure within the ventilation ducts should be neutralized so the AC unit should be turned off 60 I 55 For a period of 20 seconds 61 I 56, thus giving the locking pin or latch 7, time to engage 58 or disengage 62 depending on the required action. To open the vane 8. The low power 7 locking pin or latch will disengage and the AC unit will turn on 63 and the air pressure will blow against the vanes 8 overpowering the pressure spring tension 3, thus opening the register. Afterward the locking pin or latch 7 will re-engage 65 once the air pressure has blown the register open 64 thus holding the Register in the open position. If the Register is to close when the air pressure delay of 20 seconds takes place the Pressure Spring 3 closes the vane 57, where upon the locking pin or latch 7 will lock the vane closed 59

Intelligent HVAC Smart Register Software Logic Diagram

FIG. 9 Shows the software logic which takes effect after the Intelligent HVAC smart register application 10 is activated, turn on the power controller 71, this will turn the AC unit on 72 and the Intelligent HVAC Smart register system will be set on standby mode 73. The Intelligent HVAC smart register application 10 will run through its system checks 74175176177 in order to gauge if it is ready for operation, by checking if its individual registers have enough power in their batteries 6, and weather the NIR presence module 4 is working. If there is a problem a prompt will be sent to the smart device 8 recommending next steps for resolution. If the system check is all clear Intelligent HVAC smart register will start operation 78.

The system will begin by checking the room temperature using sensor unit 1 in the electronics module. If the room is at the set temperature 79 the vanes 8 will remain closed, and revert back to the Check system status 74. If the temperature is not at the set temperature and presence mode is on 81, the Intelligent HVAC Smart register will wait for presence in the room to be detected 80 using the NIR presence detect module 4 before opening the relevant Registers 84. Once open the Intelligent HVAC Smart register application will gauge the multiple variables such as date and time of operation 87, set Idesired temperature 88, and presence 89 to gauge whether the vane 8 needs to remain open or closed.

Once the system is in operation it immediately becomes self learning, the Intelligent HVAC smart register application 10 will begin to tabulate inputs like Date & Time 87, Temperature vs. Time 87/88, etc. to build a user database which can then be measured and benchmarked in order for the system to learn and improve the service of the Intelligent HVAC smart register application 10. All data is saved to the Intelligent HVAC smart register cloud storage service 90 where the data is analyzed and averaged over a week 91 If changes in a users behavior are recorded 92 a request is sent to the user to request a change in settings to match their behavioral patterns 93 where by the user can either confirm or deny these updates 94 user settings will be updated accordingly 95

Having thus described the embodiments of the present Invention, those of skill in the art will readily appreciate that other embodiments may be made and used which fall within the scope of the claims attached hereto.

We claim:

1. An Intelligent HVAC register airflow control system, comprising:
   a closed space;
   a sensor for sensing an environmental variable within the closed space;
   an HVAC unit including a forced air source for supplying a forced airflow Into the closed space for changing the environmental variable;
   the intelligent HVAC register, comprising:
      a controller;
      one or more airflow control vanes for controlling the forced airflow from the forced air source and into the closed space:
      wherein the controller controls the opening and closing of the one or more control vanes; and
      wherein the forced airflow from the forced air source supplies a power to open the one or more airflow control vanes.

2. The system of claim 1, further comprising:
an internal latch for holding the one or more airflow control vanes in an open position.

3. The system of claim 2, further comprising:
one or more mechanical energy storage devices for closing the one or more airflow control vanes when the airflow stops.

4. The system of claim 3, wherein the forced airflow pauses for allowing the one or more air control vanes to close.

5. The system of claim 4, wherein the intelligent register has a presence detecting sensor for determining if the closed space requires a change in the environmental variable.

6. The system of claim 1, further comprising:
one or more smart devices and a smart phone app for wirelessly programming intelligent HVAC register operation.

7. The system of claim 1, wherein the intelligent HVAC register tracks HVAC unit energy consumption and builds usage profile for optimizing HVAC unit efficiency.

8. The system of claim 2, wherein the intelligent HVAC register incorporates one or more solar cells, one or more electro-thermal devices or other auxiliary power sources for charging a battery.

9. The system of claim 3, wherein the software learns the user's behavioral patterns to optimize control of the environmental variable and HVAC unit power consumption.

10. The system of claim 4, further comprising:
a wireless network comprising intelligent HVAC registers and a main controller for the intelligent HVAC register airflow control system control and for communicating intelligent HVAC register airflow control system status.

11. The system of claim 5, wherein the controller communicates using API software via low power wireless communication technology for long usage on a single battery.

12. The system of claim 6, wherein the intelligent HVAC register wirelessly communicates with the sensor within the closed space for sensing the environmental variable.

13. The system of claim 7, further comprising:
a power regulator placed between the HVAC unit and a power source; for main controller to control the air flow.

14. The system of claim 8, wherein the main controller controls the power regulator.

15. The system of claim 5, wherein the intelligent HVAC register can be installed in an existing HVAC system turning the HVAC system into the intelligent HVAC register air flow control system.

16. The system of claim 6, further comprising:
a modular cover system, for easily changing or updating a style or an appearance of the intelligent HVAC register.

* * * * *